United States Patent [19]

Johnson

[11] Patent Number: 4,587,080
[45] Date of Patent: May 6, 1986

[54] COMPARTMENTALIZED SAFETY COOLANT INJECTION SYSTEM

[75] Inventor: Forrest T. Johnson, Baldwin Borough, Pa.

[73] Assignee: Westinghouse Electric Corp., Pittsburgh, Pa.

[21] Appl. No.: 346,339

[22] Filed: Feb. 5, 1982

[51] Int. Cl.4 .............................................. G21C 13/02
[52] U.S. Cl. .................... 376/282; 376/293; 376/298; 376/299
[58] Field of Search ................ 376/282, 293, 298, 299

[56] References Cited

U.S. PATENT DOCUMENTS

| | | | |
|---|---|---|---|
| 3,666,622 | 5/1972 | Schluderburg | 376/281 |
| 3,859,166 | 1/1975 | Flynn et al. | 376/282 |
| 3,929,567 | 12/1975 | Schabert et al. | 176/38 |
| 3,929,568 | 12/1975 | Schabert et al. | 176/38 |
| 3,966,548 | 6/1976 | Müller et al. | 376/282 |
| 3,984,282 | 10/1976 | Kleimola | 376/282 |
| 4,046,627 | 9/1977 | Middleton | 176/38 |
| 4,046,628 | 9/1977 | Middleton | 176/38 |
| 4,050,983 | 9/1977 | Kleimola | 176/38 |
| 4,080,256 | 3/1978 | Braun et al. | 376/282 |
| 4,092,490 | 5/1978 | Schabert et al. | 176/38 |
| 4,104,119 | 8/1978 | Schilling | 176/38 |
| 4,219,614 | 7/1980 | Kleimola | 261/124 |

Primary Examiner—Deborah L. Kyle
Assistant Examiner—Richard W. Wendtland
Attorney, Agent, or Firm—Daniel C. Abeles

[57] ABSTRACT

A safety coolant injection system for nuclear reactors wherein a core reflood tank is provided to afford more reliable reflooding of the reactor core in the event of a break in one of the reactor coolant supply loops. The reactor vessel, reactor coolant supply loops, emergency water storage tank and pump modules are arranged in separate compartments in the containment structure to control the flow of spilled coolant. An integrated containment spray system and normal cooldown system are also described.

20 Claims, 9 Drawing Figures

COMPARTMENTALIZED SAFETY COOLANT INJECTION SYSTEM

BACKGROUND OF THE INVENTION

1. Field of the Invention

The subject invention is related to nuclear reactors as applied to the generation of electrical power and, more particularly, to protective systems for the reactor and mechanisms for containment of coolant accidentally lost from the system.

2. Description of the Prior Art

In pressurized water nuclear reactors, heat developed by a controlled nuclear reaction is used to generate steam. The steam drives turbine generators that produce electrical power. To control radioactive contamination in the system, the steam is generated indirectly by heat exchangers that are supplied on their primary side by pressurized water that is pumped through primary coolant loops that are connected to the reactor vessel.

Water is circulated through the coolant loops at extremely high temperature and pressure. In the event of a break in the coolant supply loop, water must continue to be circulated through the reactor coolant system to remove core decay heat as the reactor is shut down. Thus, a continuous flow of water would pass through the core and spill out of the break to the floor of the containment building.

In known reactor systems, the reactor vessel and coolant loops are housed in a large, reinforced concrete structure generally referred to as a containment building. In addition to protecting the reactor and the components of the system from external forces, the containment building provides a barrier to the spread of radioactive coolant in the event of an accidental loss of coolant.

If a substantial break were to develop in the pressurized water system, the loss of pressure and coolant would cause a "blowdown" in the reactor wherein the water in the reactor core would rapidly vaporize and coolant would be expelled from the reactor vessel. Thus, such a break would leave the reactor core uncovered and subject to potential damage. Accordingly, safety injection systems have been included in the prior systems whereby, in the event of an accidental loss of coolant, supplemental coolant is supplied to reflood the reactor. In some systems, a pressurized accumulator provides coolant in response to a drop in system pressure. In other systems such as described in U.S. Pat. No. 3,929,567, supplemental emergency water cooling tanks are provided at a level sufficiently higher than the reactor vessel so that coolant is passively provided to the reactor. Still other proposed systems such as in U.S. Pat. Nos. 4,050,983 and 4,210,614 incorporate a deluge tank that is accessed through a rupture disc upon an accidental loss of coolant.

In some systems, an emergency water supply was provided for reflooding the reactor core after the accumulator had refilled the lower plenum and downcomer of the reactor vessel. The emergency water supply was stored in an auxiliary building and provided to the reactor through a suction line and redundant safety injection pumps. In these systems, the pumps had to be reconnected to the containment building sump upon depletion of the water level in the emergency water storage tank. There was no diverse system to reflood the reactor core if the safety injection pumps should fail to operate. Furthermore, the injection pumps that were used in the core reflood operation were designed to operate at pressures far below the normal operating pressure for the reactor system.

In addition to the safety injection system, other auxiliary systems have also supported the normal and emergency operation of the nuclear power plant. Included among these auxiliary systems are containment spray systems, and the normal decay heat removal or residual heat removal system. Those systems were generally supplied by the same water storage tank. In some systems, such as described in U.S. Pat. No. 4,104,119, the auxiliary water storage tank is also used as a heat sink and for an emergency water supply for the steam generator.

The substantial cross-connection between auxiliary systems outside the containment building resulted in the location of all valves, pumps, heat exchangers and other associated equipment in an auxiliary building remotely located from the containment building. A loss of coolant accident or a normal decay heat removal operation required that radioactive water be pumped from the containment building into the auxiliary building. The auxiliary building was compartmentalized with respect to these systems and is designed according to Government regulations to contain a coolant leak at a specified rate for a limited period of time. However, if the leak were to exceed the specified rate or were to continue for a time in excess of the specified period, the potential existed for loss of containment of the leak. Furthermore, the auxiliary building tanks were insufficient to accommodate the volume of contaminated water that could be lost from the containment building. Therefore, there was also a potential that contaminated water would eventually flood the auxiliary building. As another complication, if the auxiliary building tanks were to rupture, there would be no source of water for the coolant injection system or auxiliary system and, therefore, nothing to prevent a core meltdown and containment rupture upon an accidental loss of coolant. Accordingly, there was a need to avoid circulation of radioactive water through the auxiliary building.

In systems such as disclosed in U.S. Pat. No. 4,092,490, the containment building is provided with extensions intended to protect the piping and valves adjacent the containment building. Other systems have attempted to avoid extension of the containment building by locating the auxiliary equipment between the inner liner and the outer shell of the containment building. One example of such a system is illustrated in U.S. Pat. No. 3,929,568. However, the emergency feed water is not confined to the containment building by either of these systems.

In all these prior art systems, the potential remained for escape of radioactive water outside the containment building, in the event of an accidental loss of coolant. Accordingly, there was a need in the prior art for a nuclear reactor system wherein the protection to the core associated with a loss of coolant accident would be improved and the potential for the escape of radioactive coolant outside containment significantly reduced.

Furthermore, the prior systems have not generally provided for an economically and practically feasible manner in which a nuclear power plant could promptly be returned to operation following a loss of coolant accident. In prior systems, the containment building had no special means to limit or control the spread of coolant within the building once it escaped from the coolant loop. Thus, the task of recovering any spilled coolant and cleaning up the reactor system was very time-consuming and expensive. As the refueling water storage tank was drained, the residual heat removal system, safety injection system, containment spray systems and other auxiliary systems were reconnected to the containment building sump as the water source. In this case, the containment spray system would spray highly radioactive fluid throughout the entire containment building. Re-entry of the containment building would thereafter require a remote decontamination of the entire building—including removal and reprocessing of perhaps 500,000 to 700,000 gallons of radioactive water. Accordingly, there was a need for a system that could be recovered and quickly and efficiently returned to service.

Another disadvantage with prior systems has been that there was no convenient mechanism to dynamically test the pumps and related valves and piping. For example, in some systems, performance could be verified only during refueling operations when the top of the reactor vessel was removed. Even then an elaborate and time-consuming procedure was required to develop a few data points from which the entire range of performace had to extrapolated. Therefore, there was also a need for an improved system that would permit the dynamic testing of the pumps and valves in an efficient manner.

SUMMARY OF THE INVENTION

In accordance with the subject invention, in a nuclear reactor system of the pressurized water type, coolant is circulated from a reactor vessel through a reactor coolant supply loop that includes a reactor coolant pump and a steam generator. The system further includes a containment building having a reactor compartment that contains the reactor vessel and a reactor coolant loop compartment that contains the reactor coolant pump, the steam generator and related piping for one reactor coolant supply loop. The containment building also includes at least one emergency water storage tank that is in communication with the reactor coolant loop compartment through a spillway. The nuclear reactor system further includes a pump module that is connected to the emergency water storage tank and to the reactor vessel through an injection line for circulation of borated water from the emergency water storage tank directly into the reactor vessel, following an accidental loss of coolant or steam.

Preferably, the reactor system includes a core reflood tank that is connected to the injection line to the reactor vessel. The core reflood tank cooperates with an accumulator to provide injection water to the reactor vessel to reflood the reactor core following a loss of coolant and a blowdown of the reactor core.

Also preferably, the containment building further includes a pump compartment for the pump module. The pump module includes an injection pump and containment spray pump together with the valves for connecting and disconnecting the pumps to the emergency water storage tank and to the refueling water storage tank.

Also preferably, the containment spray pump is connected to the refueling water storage tank to spray water inside the containment building in response to a high pressure condition in the containment building. Also, an emergency letdown heat exchanger is included between the reactor vessel and the emergency water storage tank to cool the water returned to the emergency water storage tank to below its saturation temperature.

Other details, objects and advantages of the invention will become apparent as the following description of a presently preferred embodiment of the invention proceeds.

BRIEF DESCRIPTION OF THE DRAWINGS

The accompanying drawings show a presently preferred embodiment of the invention in which.

DESCRIPTION OF THE PREFERRED EMBODIMENT

Figure 1:
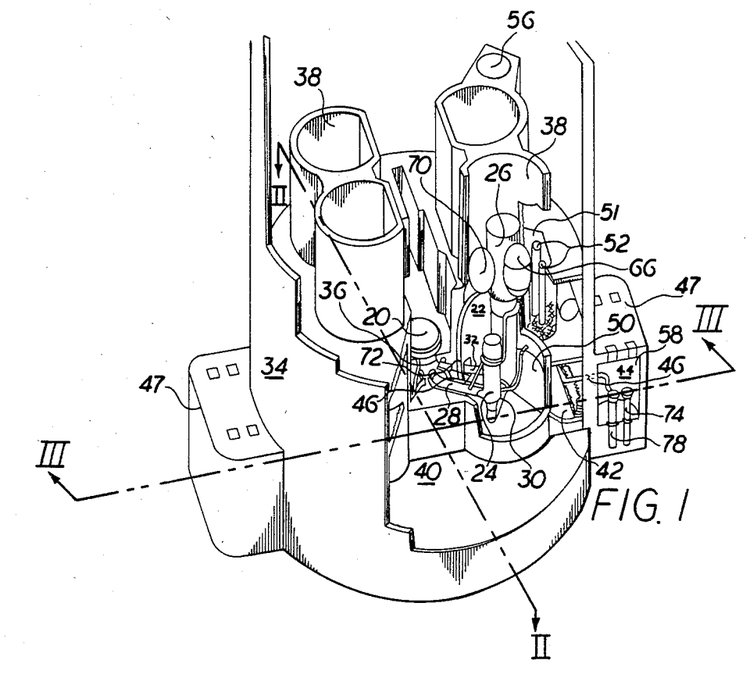
FIG. 1 is a perspective view of the nuclear reactor system herein disclosed wherein portions of the system are broken away to better disclose the subject invention.
Figure 2:
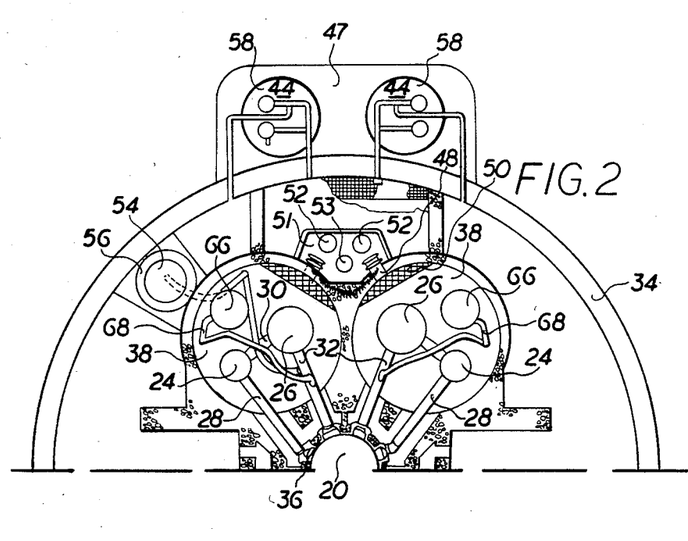
FIG. 2 is a cross-sectional plan view of the system shown in FIG. 1 taken along the lines II—II in FIG. 1.
Figure 3:
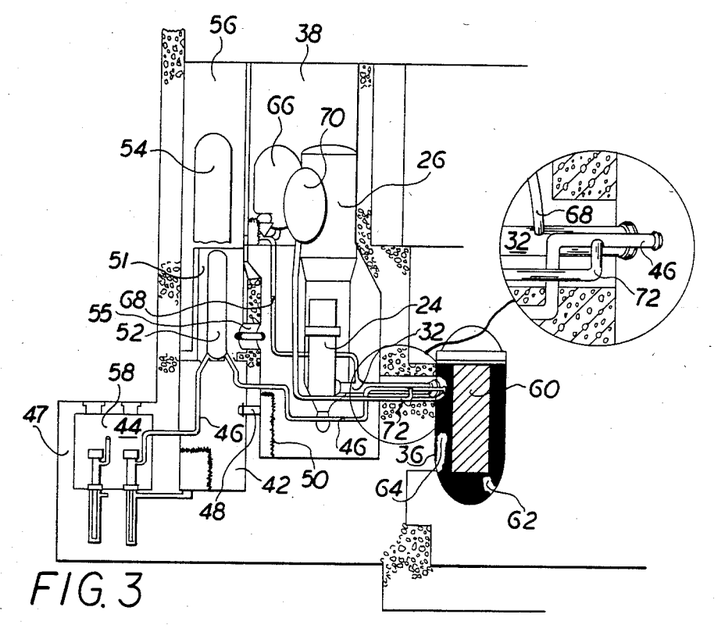
FIG. 3 is a cross-sectional elevation view of the system shown in FIG. 1 taken along the lines III—III in FIG. 1.

As shown in FIGS. 1-3, the presently disclosed invention is a nuclear reactor system of the pressurized water type. The reactor system includes a reactor vessel 20 that is cooled by four identical reactor coolant supply loops 22. Each of the reactor coolant supply loops 22 includes a reactor coolant pump 24 and a steam generator 26. Water coolant circulating through supply loop 22 is drawn from the reactor vessel 20 through a pipe or "hot leg" 28 and is provided to steam generator 26 through a cross-over pipe 30. In steam generator 26, the coolant vaporizes water in an adjacent but isolated secondary line to produce steam. The steam is used to drive turbine generators that produce electrical power. The water in supply loop 22 discharged from the primary side of steam generator 26 is returned to reactor vessel 20 through return pipe or "cold leg" 32. Also included in the disclosed nuclear system is a containment building 34 that protects the other primary components of the system from corrosion or damage caused by external forces.

The water coolant circulating through supply loop 22 is at high temperature and pressure. Typically, the coolant in hot leg 28 is about 600° F. at a pressure of about 2250 psi. Accordingly, the potential exists for an accidental rupture or break in supply loop 22 and a loss of coolant therefrom. In accordance with the subject invention, containment building 34 is compartmentalized to contain the water in the unlikely, but potential, event of a loss of coolant, thus limiting the difficulty and expense of recovering and cleaning up the spilled coolant.

Containment building 34 includes a reactor vessel compartment 36 and a reactor coolant loop compartment 38 corresponding to each of the supply loops 22. Reactor vessel compartment 36 contains reactor vessel 20. Each of the reactor coolant loop compartments 38 includes the reactor coolant pump 24 and steam generator 26 corresponding to one of supply loops 22 together with the respective hot leg 28, crossover 30 and cold leg 32. Loop compartments 38 are independent of each other and are sealed from the reactor vessel compartment 36 around hot leg 28 and cold leg 32 with waterproof seals. Loop compartments 38 are provided with radioactive shielding and are water tight from their base at least to the level of the top of refueling canal 40. In the event of a break or rupture in one of the supply loops 22 resulting in a loss of coolant, the spilled coolant would be confined within the corresponding loop compartment 38. Pumps (not shown) can be provided in loop compartment 38 to pump out reactor coolant during recovery and clean-up operations.

To replace the coolant lost through a break in supply loop 22, containment building 34 is further provided with an emergency water storage tank 42 that contains a supply of borated water. The borated water is drawn from storage tank 42 by a pump module 44 and injected directly into a reactor vessel 20 through an injection line 46. Location of emergency water storage tank 42 within containment building 34 insures the availability of a water source to pump module 44 to replace the lost coolant. If the emergency water storage tank 42 were to fail, water would merely flow to the floor of containment building 34 and would still be supplied to pump module 44 from the containment building sump. Direct injection of coolant into reactor vessel 20 obviates the entrainment of the injected water by high velocity steam in the coolant loops 22. Direct vessel injection also eliminates the loss of the injection system corresponding to the ruptured coolant loop 22. Preferably, two emergency water storage tanks 42 are provided adjacent the outer wall of containment building 34 with the tanks 42 being interconnected and oppositely arranged. Preferably, the two emergency water storage tanks 42 are interconnected by a line passing through reactor vessel compartment 36 and directly under reactor vessel 20. In the event of a core meltdown and rupture of vessel 20, the melted core would also melt through the interconnecting line, thus causing storage tank 42 to flood vessel compartment 36. Also preferably, pump modules 44 are arranged in pairs inside an extension 47 of containment building 34 adjacent one of emergency water storage tanks 42.

Loop compartment 38 is in communication with emergency water storage tank 42 through a spillway 48. A screen 50 is provided across spillway 48 to prevent debris from entering emergency water storage tank 42. Thus, a semi-closed flow path for the water is provided from supply loop 22 to loop compartment 38 to emergency water storage tank 42, to pump module 44 to reactor vessel 20 and back to supply loop 22. As the borated water from emergency water storage tank is recirculated through reactor vessel 20, the temperature of the water circulated through pump module 44 and injection line 46 will gradually increase. Therefore, a residual heat removal heat exchanger 52 is provided in injection line 46 to transfer heat from the water in line 46 to a component cooling water system.

As shown in the Figures, spillway 48 is located at a level below the bottom of hot leg 28. Establishing spillway 48 at that elevation obviates the criticality of the seals around hot leg 28 and cold leg 32 between reactor compartment 36 and loop compartment 38. Alternatively, spillway 48 can be located at a level substantially equal to the level of the mounting flange of reactor coolant pump 24. Thus, in the event of a break in supply loop 22, water spilling from the break in loop 22 would fill the corresponding loop compartment 38 up to the level of spillway 48. Thereafter, the water would flow through spillway 48 into emergency water storage tank 42. Thus, the break would be covered with several feet of water. In this way, if the flow from pump module 44 were to terminate, loop compartment 38 would operate as a large accumulator to provide adequate core cooling for an extended time period.

As shown in FIGS. 1 and 3, loop compartments 38 are open at the top. Alternatively, they can be provided with separate umbrella-like covers (not shown) to prevent entry of water from the containment spray system as hereafter explained. The umbrella-like covers would also permit flashing steam to vent from loop compartments 38 to the containment building 34, but deflect any water jets sprayed from the break in supply loop 22 so that the water would remain inside loop compartment 38 and would not escape into containment building 34.

According to the preferred embodiment, containment building 34 is further provided with compartment 51 for containing residual heat removal heat exchanger 52 and emergency letdown heat exchanger 53. Preferably, compartments 51 are located between adjacent loop compartments 38 and above emergency water storage tank 42. Compartments 51 are in communication with emergency water storage tank 42 so that leakage of highly contaminated water from the heat exchangers 52 or 53 or their associated piping and valves flows back into emergency water storage tank 42. Compartments 51 extend upwardly to an elevation of at least the top of refueling canal 40 and are in communication with each of the adjacent loop compartments 38 through an opening 55 located at a level that is slightly above the normal full level of refueling canal 40. These openings operate as steam vent paths for the emergency water storage tanks 42 as well as an overflow path from loop compartments 38 back to the emergency water storage tank 42 through compartment 51.

The disclosed system further includes a pressurizer relief tank 54 that controls the pressurization of the reactor system. Pressurizer relief tank 54 is contained in a pressurizer relief tank compartment 56 of containment building 34. Pressurizer relief tank compartment 56 is located at a level above emergency water storage tank 42. Preferably, the drains of the pressurizer relief tank compartment 56 are directed to the emergency water storage tank 42. Also preferably, refueling canal 40 is drained into the emergency water storage tank 42. Thus, coolant lost at either location is contained in emergency water storage tank 42.

Also in accordance with the subject invention, pump modules 44 are contained in respective pump compartments 58 within extensions 47 of the cylindrical portion of containment building 34. Preferably, pump compartments 58 include two redundant, submersible sump pumps (not shown), that are started in response to a liquid level signal to pump any water leaking from the pumps, valves or piping that comprises pump module 44 into emergency water storage tank 42. Also preferably, pump compartments 58 are further provided with heating, ventilating, and airconditioning units (not shown), to remove heat from pump compartment 58 and to condense steam that may result from flashing of liquid leaking from pump module 44.

As particularly shown in FIG. 3, reactor vessel 20 contains a reactor core 60 that is bounded by a lower plenum 62 and a downcomer region 64. In the event of a substantial loss of coolant, the loss of pressure on the system permits the reactor core 60 to rapidly vaporize the coolant therein. Within a few seconds, the steam developed in core 60 will "blowdown" or expel the water coolant from lower plenum 62 and downcomer 64. To avoid damage to core 60 caused by the heat of the nuclear reaction, lower plenum 62 and downcomer 64 must be refilled and core 60 must be reflooded within a few seconds.

To accomplish rapid refilling of lower plenum 62 and downcomer 64, the disclosed reactor system includes an accumulator 66. Accumulator 66 is connected to cold leg 32 by service line 68 and thereby provides an available water coolant supply to reactor vessel 20. The capacity of accumulator 66 is sufficient to refill lower plenum 62 and downcomer 64. However, in the event of a major break in the supply loop 22 and blowdown of reactor vessel 20, the steam flashing in core 60 limits the rate at which core 60 can be reflooded, notwithstanding the pressure or capacity of accumulator 66. Consequently, excessive capacity of accumulator 66 merely contributes to the coolant that continues to spill out of the break in supply loop 22.

In accordance with the subject invention, to improve reflooding of reactor core 60, the nuclear system herein disclosed in further provided with a core reflood tank 70. Core reflood tank 70 is connected to the injection line 46 through a discharge line 72 at a location adjacent reactor vessel 20.

In the preferred embodiment, core reflood tank 70 is pressurized with nitrogen or other equivalent gas. Alternatively, however, core reflood tank 70 can be vented to containment building 34 and located at a level above reactor vessel 20 such that the elevation head pressure is appropriate for reflooding reactor core 60.

The preferred injection rate for core reflood tank 70 is directly related to the height differential between the column of water in downcomer 64 and the column of water in core 60. As this differential decreases, the injection rate is reduced. Therefore, to minimize the core reflood time, it is important to maintain the column of water in downcomer 64 full throughout the core reflood period. If the coolant is injected too slowly, the level in downcomer 64 decreases and the reflood rate slows. However, coolant injected faster than demanded by the core reflood rate merely spills out of the break in supply loop 22. Therefore, core reflood tank 70 is sized and provided with discharge flow resistors in discharge line 72 such that it provides the proper injection flow rate throughout the core reflood phase.

The maximum core reflood rate occurs when downcomer 64 has been completely refilled and the coolant front is starting to penetrate the bottom of core 60 as shown in FIG. 3. In accordance with core reflood demands, the head pressure provided from core reflood tank 70 is maintained at a low level such that the peak injection rate of tank 70 is early in the reflood phase with a diminishing injection flow as core 60 is reflooded. Typically, the head pressure for core reflood tank 70 is substantially 200 psia.

Figure 4:
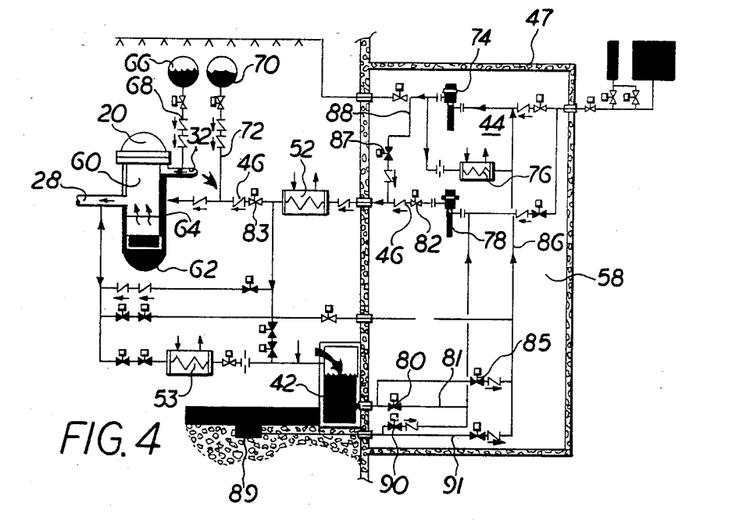
FIG. 4 is a schematic diagram illustrating the operation of the disclosed nuclear system in the safety injection mode.

As shown in FIG. 4, after reactor core 60 has been reflooded by core reflood tank 70, water coolant is provided to reactor vessel 20 by pump module 44. Pump module 44 includes low head pump 74, low head pump minimum flow heat exchanger 76 and high head pump 78.

High head pump 78 is the safety injection pump connected to emergency water storage tank 42 through injection line 46. Pump 78 injects coolant through injection line 46 directly into the reactor vessel downcomer 64 at an elevation below the bottom of cold leg 32. High head pump 78 is of sufficient capacity to inject coolant at an adequate rate to avoid substantial periods of core uncovery subsequent to minor coolant losses, and to assist in rapidly reflooding core 60 following a substantial loss of coolant.

The maximum flow requirement for pump module 44 occurs during the core reflood phase. After core 60 has been recovered, the coolant injection rate necessary for pump module 44 to maintain coverage of core 60 is substantially the boiloff rate of coolant caused by the decay heat. Therefore, the supplementation of the flow from pump module 44 by core reflood tank 70 during the core reflood phase permits the use of smaller pumps and other components in pump module 44. During coolant injection by core reflood tank 70, pump module 44 maintains a continuous injection flow rate. Preferably, core reflood tank 70 is made substantially large so that it will inject coolant at a rate adequate to reflood core 60, even without the operation of pump module 44. Thus, core 60 would be temporarily reflooded even if power to pump module 44 was lost.

Figure 5:
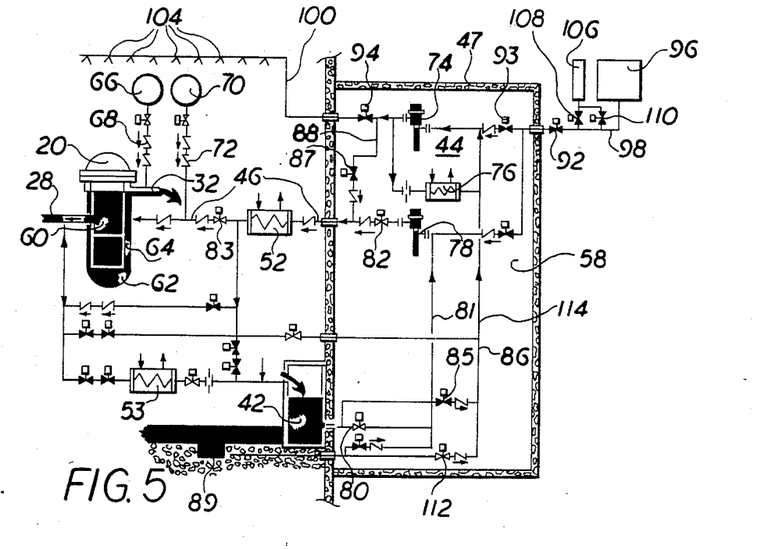
FIG. 5 is a schematic diagram illustrating the operation of the disclosed nuclear system in the spray recirculation mode after the refueling water storage tank has been depleted.

As illustrated in FIGS. 4 and 5, after accumulator 66 and core reflood tank 70 have refilled reactor vessel 20 with water coolant, coolant flows through the semiclosed path from supply loop 22 to loop compartment 38 to emergency water storage tank 42. High head pump 78 of pump module 44 draws water from emergency water storage tank 42 through valve 80 and line 81 and injects it directly into reactor vessel downcomer through injection line 46 and open valves 82 and 83. Thus, the coolant continues to recirculate through the system without requirement of any further valve alignment. During long term periods of core cooling following a break in the supply loop 22, low head pump 74 can be connected to the emergency water storage tank 42 through valves 85 and line 86 and provide supplemental injection of coolant through valve 87 and lines 88 and 46.

An alternative connection from pump 78 to the containment building sump 89 is also provided through a valve 90 and line 91. This connection can be opened if the water level in emergency water storage tanks should fall below a given level.

Advantageously, coolant injected in accordance with the disclosed system limits the thermal shock on core 60, reactor vessel 20 and pumps 74 and 78 because emergency water storage tank 42 is located inside containment building 34. Thus, the initial temperature of coolant in emergency water storage tank 42 would be substantially the same as the temperature within building 34. Typically, this will be in the range of 100°–120° F. During the continued operation of the injection system, the temperature of coolant passing through pumps 78 would gradually increase from about 100° F. to about 300° F. as the saturated water spilling from loop 22 gradually heated the entire volume of water in emergency water storage tank 42.

As illustrated in FIG. 5, when pressure in containment building 34 exceeds a predetermined level, either because of a loss of coolant or because of a steam break, low head pump 74 is aligned by valves 92, 93 and 94 to draw water from a refueling water storage tank 96 through line 98 and provide it through line 100 to headers 104 located at the top of containment building 34. Alternatively, a spray header can be provided adjacent the top of loop compartment 38 to selectively spray that compartment instead of the entire containment building 34. Preferably, the disclosed system includes two refueling water storage tanks 96 located in an auxiliary building (not shown). Spray additive tank 106 is connected in parallel with storage tank 96 through valves 108 and 110 and drains down uniformly with the level of water in tank 96 to control the ph of the containment spray.

Pump 74 is stopped in response to a low level signal in tank 96. At that time, the operator determines whether recirculation of the spray from containment sump 89 is necessary. If so, low head pump 74 is aligned with sump 89 of the containment building 34 through valve 112 and line 114 to recirculate the water previously drawn from the refueling water storage tank 96. Since switchover to the containment sump 89 is manual, unnecessary cleanup and water damage to equipment caused by recirculation of the containment spray due to an unnecessary automatic switchover can be averted. Furthermore, since the highly contaminated coolant water circulated through reactor vessel 20 is drained into the emergency water storage tank 42 and not containment sump 89, the contamination of the system due to recirculation of the contaminant spray is substantially less than in prior art systems wherein all the highly contaminated spillage from the coolant loop drained into the contaminant sump along with the containment spray.

Figure 6:
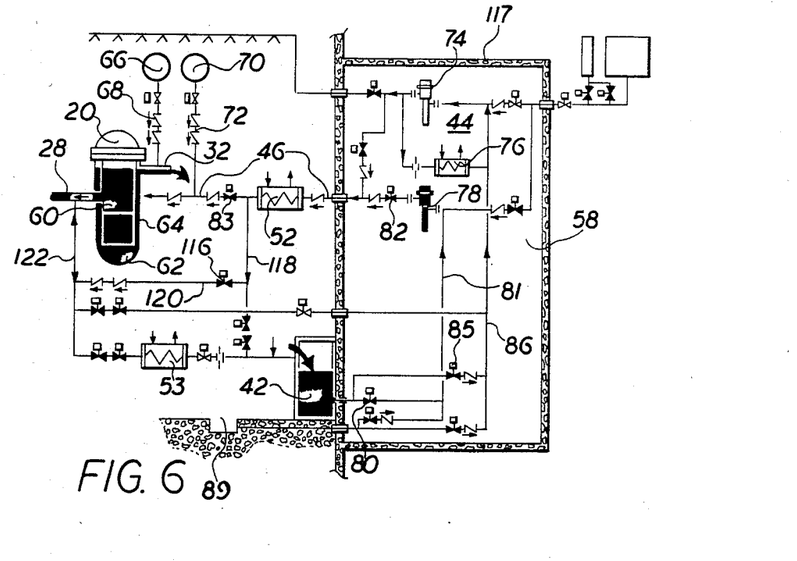
FIG. 6 is a schematic diagram illustrating the operation of an alternative embodiment of the subject invention wherein the recirculated coolant is injected into the hot leg of the coolant loop.

FIG. 6 illustrates an alternative injection path in accordance with the subject invention that could be utilized in the event of a substantial break in cold leg 32. As in the injection path of FIG. 4, the coolant is drawn out of emergency water storage tank 42 through valve 80 and line 81 by pump 78. Valve 83 is closed and coolant is provided through valves 82 and 116 and lines 46, 118, 120 and 122 to hot leg 28. The coolant then flows through reactor vessel 20, out of cold leg 32 and into loop compartment 38. From loop compartment 38, the coolant flows through spillway 48 back into emergency water storage tank 42.

Figure 7:
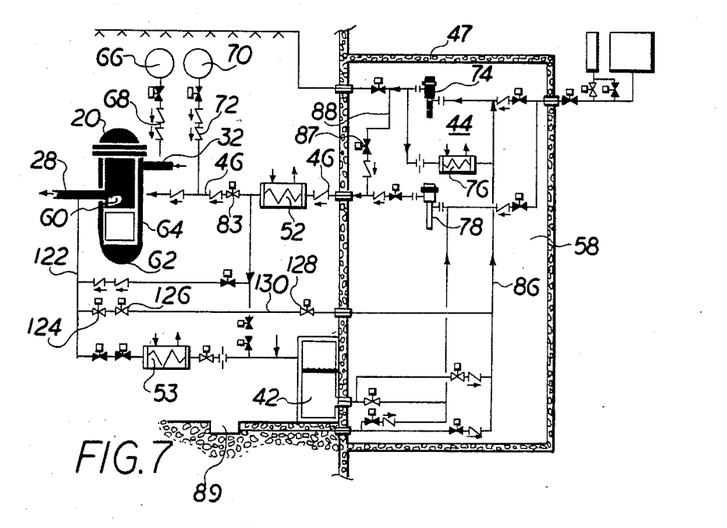
FIG. 7 is a schematic diagram illustrating the operation of the disclosed nuclear system while operating in the normal cooldown mode.

As illustrated in FIG. 7, residual heat removal heat exchanger 52 removes decay heat from core 60 during normal shutdown as well as during emergency core cooling. Heat exchanger 52 has a design pressure of 2250 psig. During normal cooldown operations, low head pump 74 is connected to injection line 46 and residual heat removal heat exchanger 52 through valve 87 and line 88. Valve 83 is open connecting heat exchanger 52 to reactor vessel 20 through valve 83. A return line from hot leg 28 to pump 74 is established through valves 124, 126 and 128 and lines 122, 130 and 86. Pump 74 circulates coolant through this loop while heat is dissipated therefrom to the component cooling water system through heat exchanger 52.

Figure 8:
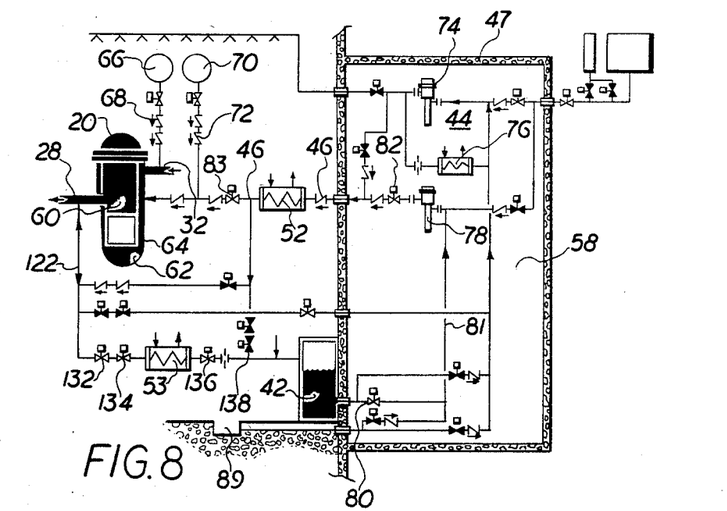
FIG. 8 is a schematic diagram illustrating the operation of the subject invention during emergency letdown in response to a steam break.

As shown in FIG. 8, the disclosed system further provides an emergency boration/letdown circuit used in the event of a break in a steam line to borate reactor 20 independently of other chemical and volume controls. The injected borated water compensates for the decrease in the coolant volume and also counteracts a tendency for core reactivity to increase during cooldown of core 60. In the operation of the system in this mode, reactor vessel 20 is first depressurized to below the shut-off head of pump 78 by opening the vent of pressurizer relief tank 54 (FIGS. 1–3). Pump 78 is connected to emergency water storage tank 42 through valve 80 and line 81 and coolant is injected into vessel 20 through valves 82 and 83, injection line 46 and heat exchanger 52. A return path is provided from hot leg 28 to emergency water storage tank 42 through valves 132, 134 and 136 and lines 122 and 138. Emergency letdown heat exchanger 53 is included in line 138. A semi-closed recirculation loop from hot leg 28 to emergency letdown heat exchanger 53 to emergency water storage tank 42 to pump 78 to heat exchanger 52 to reactor vessel 20 is thus established. Heat exchanger 53 transfers the heat from the letdown flow to the component cooling water system and thus reduces the temperature of the coolant flowing into storage tank 42 to a subcooled state. Typically, the flow is cooled to below 190° F. Heat exchanger 52 is also used to further reduce the flow temperature. Preferably, emergency letdown heat exchanger 53 is sized to provide emergency heat removal upon loss of the secondary heat sink, as for example, due to a leak in the component cooling water system.

Figure 9:
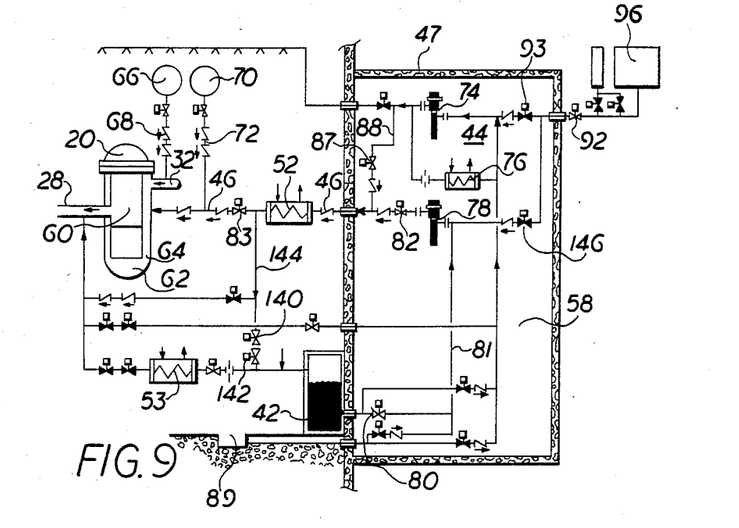
FIG. 9 is a schematic diagram illustrating the operation of the subject invention during a dynamic test of the pump module.

FIG. 9 shows that the disclosed system further provides flow paths for dynamically testing pump module 44. Specifically, valves 140 and 142 are opened to provide a flow path through line 144 from the discharge end of heat exchanger 52 to emergency water storage tank 42 while pumps 74 and 78 are aligned through valves 92, 93 and 146 with refueling water storage tank 96. Water drawn from refueling water storage tank 96 while pumps 74 and 78 are being tested is thus discharged into emergency water storage tank 42 through line 144.

While certain presently preferred embodiments of the invention are shown and described herein, it is to be understood that the subject invention is not limited thereto but may be otherwise variously embodied within the scope of the following claims.

I claim:

1. A nuclear reactor system wherein pressurized water coolant is circulated from the reactor vessel through at least one reactor coolant supply loop that includes a reactor coolant pump and a steam generator, said system being housed in a containment building, said system comprising:

a compartment that includes the reactor vessel;

a reactor coolant loop compartment corresponding to each reactor coolant loop that includes the reactor coolant pump and steam generator of a single reactor coolant supply loop, the loop compartment having a water-tight base and sidewalls satisfactory to contain leakage from the coolant loop within the loop compartment;

an emergency water storage tank within the reactor containment building that is in communication with the reactor coolant loop compartment through a spillway positioned to drain coolant leakage within the loop compartment above a given level, into the emergency water storage tank;

a pump module that is connected to the emergency water storage tank and to the reactor vessel, said pump module being operative to draw coolant from the emergency water storage tank and supply it to the reactor vessel; and a containment building sump located in a lower portion of the containment building separate and normally isolated from the emergency water storage tank and loop compartment, normally serving as a fluid collecting reservoir for substantially all non-radioactive fluids drained in the containment building from outside the loop compartment.

2. The reactor system of claim 1 further comprising:
a refueling water storage tank that is separate from the emergency water storage tank;
a containment spray system; and
a containment spray pump that is connected to the refueling water storage tank and to the containment building sump, said spray pump selectively drawing coolant from the refueling water storage tank or from the containment building sump and providing said water to the containment spray system.

3. The system of claim 2 including a refueling canal adjacent the reactor vessel, wherein the loop compartment extends upwardly to an elevation at least as high as the top of the refueling canal.

4. The system of claim 1 or 3 wherein the loop compartment is provided with a top cover sized to permit flashing steam within the loop compartment to vent air to the containment building while deflecting any water jet sprayed from a break in the supply loop so that the water would remain inside the loop compartment and would not escape into the containment building.

5. The system of claim 1, or 3 wherein the loop compartment is provided with an alternate spray header that selectively sprays only the loop compartment.

6. The system of claim 1 or 3, further comprising:
a screen adjacent the spillway, said screen being gauged to block entry of floating debris into the emergency water storage tank.

7. The system of claim 1 further comprising:
a pressurizer relief tank; and
a third compartment that contains the pressurizer relief tank and that is located above the emergency water storage tank such that primary coolant in the third compartment drains into the emergency water storage tank.

8. The system of claim 1 or 7 including a refueling canal adjacent the reactor vessel, said system further comprising:
a heat exchanger compartment having an auxiliary heat exchanger used for cooling the reactor coolant to remove residual heat, located vertically above the emergency water storage tank and in fluid communication therewith to permit fluid leaked into the heat exchanger compartment to drain by gravity to the emergency water storage tank.

9. The system of claim 8 wherein a steam vent path is provided between the emergency water storage tank and the heat exchanger compartment, and wherein steam vent paths are provided between the heat exchanger compartment and each adjacent loop compartment at a level higher than the level corresponding to the full level of the refueling canal.

10. A pressurized water reactor system wherein primary coolant is circulated through a reactor from at least one reactor coolant supply loop, said reactor system having auxiliary systems that include an emergency core cooling system, a containment spray system, and a residual heat removal system, said reactor system comprising:
a containment building for housing the reactor, said containment building having watertight compartments for separately housing each of the reactor coolant supply loops;
a containment extension connected to the containment building and having at least one pump compartment that includes pumps and valves associated with said auxiliary systems;
a sump pump located within the pump compartment that pumps water that may leak from the pumps or valves in the pump compartment, out of the pump compartment and into an emergency water storage tank used for emergency core cooling, in response to a predetermined liquid level in said pump compartment; and
wherein the pump compartment is provided with heating, ventilating and air conditioning units that remove heat and steam developed by the pumps and convected by the reactor coolant.

11. An integrated nuclear power plant system housed in a containment building, said system comprising;
a pump module;
a refueling water storage tank connected to said pump module;
an emergency water storage tank located within the containment building and selectively connected to said pump module;
a residual heat removal heat exchanger that is connected to the pump module and to the reactor vessel by an injection line;
wherein said pump module comprises,
a low head pump connected to said refueling water storage tank,
a minimum flow heat exchanger connected in a feedback loop around said low head pump, and
a high head pump that is connected to the emergency water storage tank and to the injection line that is connected to the residual heat removal heat exchanger; and
an emergency letdown heat exchanger connected to the hot leg of the reactor cooling loop and to the emergency water storage tank such that the water can be circulted from the hot leg to the emergency letdown heat exchanger, to the emergency water storage tank, to the high head pump, and back to the reactor vessel through the injection line and the residual heat removal heat exchanger.

12. The system of claim 11 wherein the residual heat removal heat exchanger operates at substantially the same pressure as the reactor vessel.

13. The system of claim 11 wherein the emergency letdown heat exchanger reduces the temperature of the output flow to below 190° F.

14. The system of claim 13 wherein throttling valves are located between the high head pump and the residual heat removal heat exchanger to control the coolant flowing to the reactor vessel.

15. The system of claim 11 further comprising:
a flow path connected between the output of the residual heat removal heat exchanger and the emergency water storage tank, said flow path providing a means for dynamically testing said pump module.

16. The reactor system of claim 1 including a plurality of emergency water storage tanks positioned at spaced locations within the containment building and interconnected by a fluid conduit passing under the reactor vessel.

17. The reactor system of claim 1 wherein the spillway is positioned within the loop compartment at an elevation below a hot leg of the coolant loop.

18. The reactor system of claim 1 wherein the spillway is positioned within the loop compartment at an elevation below a mounting flange of the reactor coolant pump.

19. The system of claim 4 wherein the top cover is constructed to be umbrella-like in form.

20. The system of claim 3 wherein the loop compartment is provided with a top cover and an alternate spray header that selectively sprays only the loop compartment.

* * * * *